United States Patent
Sibert et al.

(10) Patent No.: US 8,913,743 B2
(45) Date of Patent: *Dec. 16, 2014

(54) METHOD FOR DECRYPTING AN ENCRYPTED PACKET WITHIN A WIRELESS COMMUNICATION DEVICE, AND CORRESPONDING DEVICE

(75) Inventors: Hervé Sibert, Le Mans (FR); Sylviane Roullier, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 301 days.

This patent is subject to a terminal disclaimer.

(21) Appl. No.: 13/146,027

(22) PCT Filed: Jan. 19, 2010

(86) PCT No.: PCT/EP2010/050579
§ 371 (c)(1),
(2), (4) Date: Oct. 6, 2011

(87) PCT Pub. No.: WO2010/086255
PCT Pub. Date: Aug. 5, 2010

(65) Prior Publication Data
US 2012/0020477 A1  Jan. 26, 2012

(30) Foreign Application Priority Data
Jan. 27, 2009 (FR) ..................... 09 50477

(51) Int. Cl.
*H04L 29/00* (2006.01)
*H04L 29/06* (2006.01)
*H04L 9/06* (2006.01)
*H04W 12/02* (2009.01)
*H04W 88/02* (2009.01)

(52) U.S. Cl.
CPC ............ *H04L 63/10* (2013.01); *H04L 9/065* (2013.01); *H04W 12/02* (2013.01); *H04W 88/02* (2013.01); *H04L 2209/80* (2013.01)
USPC .......................................... 380/247; 380/270

(58) Field of Classification Search
CPC ....... H04L 9/065; H04L 63/10; H04W 12/02; H04W 88/02
USPC .................................. 380/247, 270
See application file for complete search history.

(56) References Cited

U.S. PATENT DOCUMENTS 6,876,747 B1 *  4/2005  Faccin et al. .................. 380/247
7,065,340 B1 *  6/2006  Einola et al. .................. 455/410

(Continued)

FOREIGN PATENT DOCUMENTS

EP    1 827 045 A1    8/2007

OTHER PUBLICATIONS

Universal Mobile Telecommunications Systems (UMTS); Cryptographic Algorithm Requirements (3GPP TS 133 105 version 7.0.0 Release 7); ETSI Standards, Jun. 1, 2007 XP014038436.

(Continued)

*Primary Examiner* — Michael Pyzocha
(74) *Attorney, Agent, or Firm* — Patent Portfolio Builders PLLC

(57) ABSTRACT

Method for decrypting, within a wireless communication device, a sequence of encrypted packets received via a wireless communication channel between the communication device and a cell assigned to this device, comprising for each packet the following steps: —the computation of an encrypting sequence corresponding to the packet (21); and —the decrypting of the packet with the aid of the said encrypting sequence (22). In this method, the encrypting sequences are computed before the reception of the packets while the reception quality is above a threshold (20, TH) and an indication of change of cell is not received (24).

7 Claims, 2 Drawing Sheets

(56) References Cited

U.S. PATENT DOCUMENTS

| | | | |
|---|---|---|---|
| 8,224,290 B2* | 7/2012 | Reddy et al. | 455/410 |
| 2004/0008844 A1* | 1/2004 | Lide et al. | 380/275 |
| 2005/0013277 A1* | 1/2005 | Marque-Pucheu | 370/336 |
| 2006/0030294 A1 | 2/2006 | Funnell et al. | |
| 2006/0093143 A1* | 5/2006 | Maeda et al. | 380/256 |
| 2006/0177050 A1 | 8/2006 | Surendran et al. | |
| 2006/0233114 A1* | 10/2006 | Alam et al. | 370/252 |
| 2007/0064634 A1* | 3/2007 | Huotari et al. | 370/310 |
| 2008/0123655 A1* | 5/2008 | Kim et al. | 370/394 |
| 2009/0034721 A1* | 2/2009 | Yan et al. | 380/42 |
| 2009/0052663 A1* | 2/2009 | Hammond et al. | 380/44 |
| 2009/0075628 A1* | 3/2009 | Patwardhan et al. | 455/410 |
| 2009/0156227 A1* | 6/2009 | Frerking et al. | 455/455 |
| 2010/0030882 A1* | 2/2010 | Hamada | 709/223 |
| 2010/0146580 A1* | 6/2010 | Chen et al. | 725/148 |
| 2010/0250928 A1* | 9/2010 | Goto | 713/168 |
| 2010/0265912 A1* | 10/2010 | Mildh et al. | 370/331 |
| 2011/0311043 A1* | 12/2011 | Sibert et al. | 380/31 |

OTHER PUBLICATIONS

International Search Report issued in PCT/EP2010/050579, mailed May 7, 2010.
Written Opinion of the International Searching Authority issued in PCT/EP2010/050579, mailed May 7, 2010.
Preliminary Search Report issued in FR 0950477, dated Dec. 2, 2009.

* cited by examiner

METHOD FOR DECRYPTING AN ENCRYPTED PACKET WITHIN A WIRELESS COMMUNICATION DEVICE, AND CORRESPONDING DEVICE

The present invention relates to the decryption of encrypted packets, notably within a wireless communication device such as a cellular mobile telephone.

The invention applies advantageously but non-limitingly to the communication systems defined by the UMTS, 3G or LTE standards, in particular those using decryptions of sequences of encrypted packets requiring the computation of an encrypting sequence or keystream for each packet and then the decryption of the packet with the aid of the encrypting sequence.

In networks, encryption functions are used. In particular they make it possible to ensure the confidentiality of the communication. In particular they request on reception a processing operation for decryption. This processing operation induces a time during which the user or the application waits after reception of the packet in order to have access to the data contained in the packet. Increasing numbers of interactive services are currently being offered and this time may be a handicap for offering some of these services. There is therefore a need to accelerate this processing time.

According to one method of application and embodiment, a decryption method and a wireless communication device, for example a cellular mobile telephone, are proposed that make it possible to avoid unnecessary processing operations while reducing power consumption, and in particular during the decryption of sequences of encrypted packets.

It is also proposed in particular to take account of the specifics of wireless communications for which the CPU time of the terminal is a rare resource and the packet is not certain to be received.

According to one aspect, a method is proposed for decrypting, within a wireless communication device, a sequence of encrypted packets received via a wireless communication channel between the communication device and a cell assigned to this device, comprising for each packet the following steps:
the computation of an encrypting sequence corresponding to the packet; and
the decryption of the packet with the aid of the said encrypting sequence.

According to this aspect, the encrypting sequences are computed before the reception of the packets while the reception quality is above a threshold and an indication of change of cell is not received.

In other words, according to one method of application, use is made of the measurement of the quality of the radio link which is taken on the physical layer in order to activate the precomputation of an encrypting sequence only when it is really effective. As a matter of fact, when packets are lost, the effectiveness of the precomputation of the encrypting sequences decreases.

In the normal operating mode, the physical layer assesses the reception quality, for example by determining the bit error rate or the error rate per block.

The physical layer can then inform the protocol stack of a reduction in the quality of the radio link then leading to disabling the precomputation of the encrypting sequence, or else a return to an acceptable reception quality leading to a reenabling of the precomputation of the encrypting sequence.

This means it is possible to avoid precomputing one or more encrypting sequences for nothing (thus economizing on consumption) when there is a risk that certain packets may not be received or packets may be received out of order.

Similarly, when there is a change of cell, which may lead to reception of packets out of order, the precomputation of the encrypting sequences is preferably disabled.

The computation of the encrypting sequence before reception of the corresponding packet as mentioned above saves CPU time on the mobile terminal, since the precomputation of an encrypting sequence is of no use when it is not very likely to receive the corresponding packet.

According to another aspect, a wireless communication device is proposed comprising reception means capable of receiving a sequence of encrypted packets and processing means comprising computing means capable of computing an encrypting sequence for each packet before it is received, decrypting means capable of decrypting each packet with the corresponding encrypting sequence.

According to this aspect, the reception means are capable of receiving an indication of change of cell and the processing means also comprise determination means capable of determining an item of information relating to the reception quality of the packets and control means capable, for each packet, of activating the computing means prior to the reception of the packet while the reception quality is higher than a threshold and an indication of change of cell is not received.

Other advantages and features of the invention will appear on studying the detailed description of methods of application and embodiments, taken as non-limiting examples and illustrated by the appended drawings in which:

FIG. 1 represents four modules M1-M4 representing functional elements of a mobile network. The first three M1-M3 are situated in the WAP communication device while the last M4 represents the whole of the network which allows the connection of the communication device.

All these modules collaborate and allow a use of a precomputation of an encrypting sequence. Described in detail below is the operation of the precomputation of an encrypting sequence in the case of streamed decryption, that is to say decryption of a sequence of encrypted packets.

In the case of a streamed decryption, the encrypting sequence changes for each packet. It may however be precomputed before reception of the packet because it does not depend on the content of the packet, but on parameters known to the decryption unit and/or to the protocol stack. In more precise terms, the computation of the encrypting sequence depends on a key, on an initialization vector and on the number of the packet sequence but not on the packet as such. The sequence number of the subsequent packets is known at least to the protocol stack while the key and the initialization vector are known to the decryption unit.

This precomputation makes it possible to minimize the processing time. Therefore, in the best case, that is to say if the precomputation is ended before the packet is received, the processing time perceived by the user for this first step is zero. All that remains then is the processing time of the second step. The latter requires the reception of the packet and consists in its decryption by the XOR (exclusive or) operation with the encrypting sequence.

Figure 1:
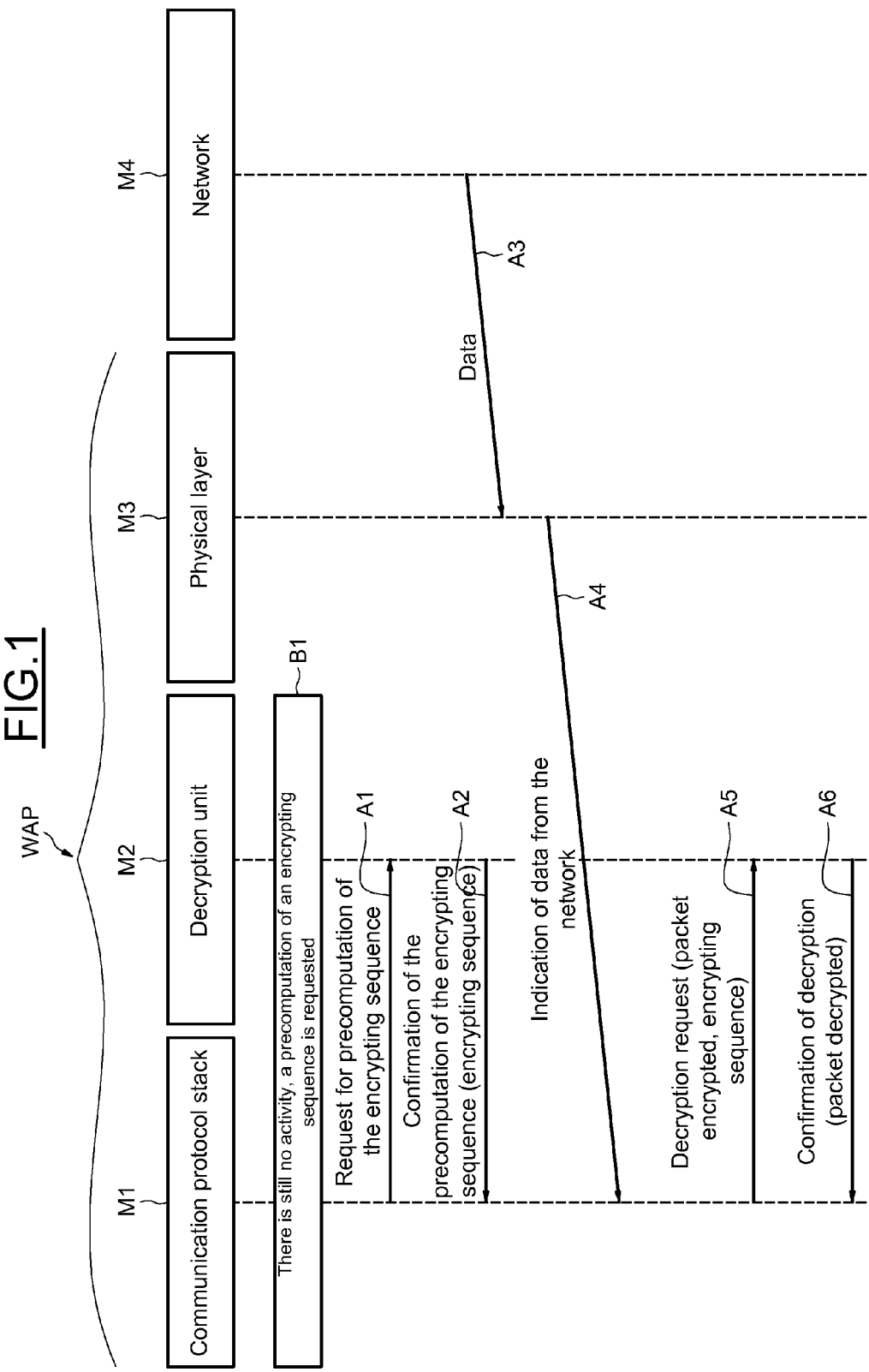
FIG. 1 illustrates schematically a method for precomputing an encrypting sequence within a wireless communication device according to one embodiment of the invention.

In FIG. 1, the first module M1 called the "protocol stack" represents the OSI standard layers higher or equal to layer 2;

they are the data link, network, transport, presentation session and application layers that are well known to those skilled in the art.

The second module M2 called the decryption unit is the unit which takes care of decryption within the communication device; this unit works on layer 2, called the data layer. As a non-limiting example, it may be the crypto-processor of a communication device.

The third module M3, called the physical layer, corresponds to the way in which the bits (1 and 0) are sent over the radio link. It consists for example of electronic and/or logic circuits processing the appropriate signal (modulation and radiofrequency stage in particular).

The fourth module M4 called network represents in particular the communication channel (the radio link), a cell to which the communication device is assigned and other cells to which the communication device is capable of being assigned.

Beneath these four modules, a sequence of events and actions are shown. The events are represented in block form, while the actions or communications are in the form of text above an arrow. The events and the actions are shown according to the functional entity that is concerned and according to the time that elapses from the top to the bottom of the figure.

The first block B1 illustrates the fact that there is not yet any activity and then that a precomputation of an encrypting sequence is requested; this case may correspond to the communication device being switched on after a shutdown or a standby mode.

Beneath this first block B1, an action (A1) is shown corresponding to a request for a precomputation of the encrypting sequence; the precomputation request coming, for example, from the service layers is relayed to the decryption unit. This request A1 contains the sequence number of the packet for which the encrypting sequence is precomputed.

Then, the decryption unit using the available key and initialization vector computes the encrypting sequence with the sequence number. The decryption unit then transmits (A2) the result of this computation to the protocol stack. This transmission is the confirmation of the computation of the encrypting sequence and comprises the encrypting sequence. The protocol stack then stores this encrypting sequence in readiness for the reception of the corresponding packet.

During the reception (A3) of data by the physical layer, the latter informs (A4) the protocol stack of the reception of the data from the network; these data are also transmitted to the protocol stack during this communication.

The protocol stack requests (A5) the decryption of the packet that it has just received amongst the data transmitted by the physical layer. In this request packet, the previously-stored encrypting sequence and the encrypted packet to be decrypted are sent.

The decryption unit returns (A6) the decrypted packet to the protocol stack. The decrypted packet can then be transmitted to the service layers.

The use of the precomputation of the encrypting sequence that has just been described allows a significant reduction of the perceived time in the step of computing the encrypting sequence. However, the systematic precomputation of the encrypting sequence may be of no use and may consume CPU time in the communication device. This is the case, for example, if the packet for which the encrypting sequence was intended for decryption is not, in the end, received or if the packet sequence is received out of order. One of these cases may occur if the mobile phone is moving and travels from one cell to another, called handover, or if the radio link is not of good quality.

Figure 2:
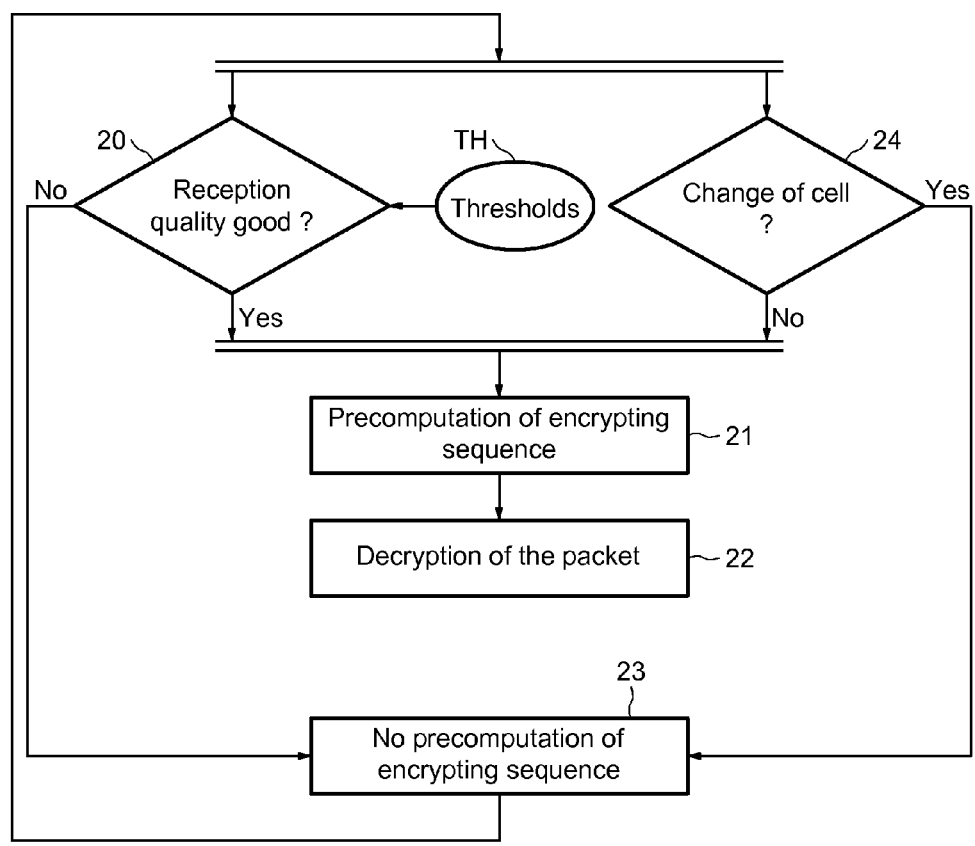
FIG. 2 illustrates schematically a method of application of the method according to the invention.

FIG. 2 illustrates an application of the conditional precomputation of an encrypting sequence according to the invention.

This precomputation may be conditional upon the reception quality. And it is assumed in this instance that it is not a situation of a change of cell.

The reception quality may be determined by the bit error rate and/or the error rate per block. It would however be possible also to use other factors such as, for example, a channel quality indicator (known as CQI to those skilled in the art), for assessing the reception quality.

The bit error rate (known as BER to those skilled in the art) and the error rate per block are computed by the communication device. They are compared (step 20) with predefined thresholds TH; while these thresholds are not reached, the precomputation of the encrypting sequence continues (step 21). The computation of the BER and of the error rate per block and the comparison with predefined thresholds are preferably carried out by elements of the functional entity called the physical layer. When reception, which is initially good, becomes bad, that is to say for example when the BER and error rate per block computations demonstrate this bad reception with a defined threshold being exceeded, it is preferable to stop the precomputation (step 23).

This event detected by the physical layer is associated with an action carried out by the physical layer indicating that the radio link is of bad quality. In other words, the physical layer, after a test demonstrating that one of the thresholds has been exceeded, relays to the protocol stack the information that the quality of the radio link is bad. The control means collaborating with the protocol stack receive this information, stop the precomputation of the encrypting sequence and no longer ask the decryption unit for this precomputation. In this case, the encrypting sequence associated with an encrypted packet will be computed on the effective reception of the encrypted packet.

After having been in a mode in which the precomputation is stopped, the precomputation according to the invention can restart when the favourable conditions exist again and when this is relayed to the control means.

This corresponds, for example, to the signalling by the physical layer to the protocol stack that the physical link is again of good quality. The control means then interpret this information and the precomputation of the encrypting sequence is reinstated.

A factor other than the reception quality may influence whether the precomputation of the encrypting sequence is stopped.

This other factor may be, for example, a request for a change of cell (or handover as it is known to those skilled in the art) from the network to the protocol stack. The handover command is, for example, sent by the network when the communication device moves from one cell to another.

The control means receiving the handover command or the change of cell (step 24) from the protocol stack, although receiving an item of information of good quality of the radio link, stop the precomputation of the encrypting sequence (step 23). The precomputation of the encrypting sequences may then resume at the end of the handover process in the presence of good reception quality.

As indicated above, the control means enabling or disabling the precomputation of the encrypting sequence in interaction with the protocol stack may be realized for example in the form of software or in the form of logic circuits.

The invention claimed is:

1. Method for decrypting, within a wireless communication device, a sequence of encrypted packets received via a wireless communication channel between the communication device and a cell assigned to this device, comprising for each packet the following steps:
   the computation of an encrypting sequence corresponding to the packet; and
   the decrypting of the packet with the aid of the said encrypting sequence;
wherein the encrypting sequences are computed before the reception of the packets while the reception quality is above a threshold and an indication of change of cell is not received, and
wherein the encrypting sequences are not computed before the reception of the packets while the reception quality is not above the threshold and the indication of change of cell is not received.

2. Wireless communication device comprising reception means capable of receiving a sequence of encrypted packets and processing means comprising computing means capable of computing an encrypting sequence for each packet before it is received, decrypting means capable of decrypting each packet with the corresponding encrypting sequence, wherein the reception means are capable of receiving an indication of change of cell and wherein the processing means also comprise determination means capable of determining an item of information relating to the reception quality of the packets and control means capable, for each packet, of activating the computing means prior to the reception of the packet while the reception quality is higher than a threshold and an indication of change of cell is not received, and not activating the computing means prior to the reception of the packet while the reception quality is not higher than the threshold and the indication of change of cell is not received.

3. A method for reducing time delays associated with decryption processing of encrypted packeted data received by a wireless communication device in a wireless communication network, the method comprising:
   measuring reception quality between the wireless communication device and the wireless communication network;
   receiving encrypted packeted data in the wireless communication device;
   computing a decrypting sequence in the wireless communication device;
   wherein the step of computing a decrypting sequence is performed prior to the step of receiving encrypted packeted data if measured reception quality is above a threshold, and
   wherein the step computing a decrypting sequence is not performed prior to the step of receiving encrypted packeted data if the measured reception quality is not above the threshold.

4. The method of claim 3 further comprising detecting a handoff of the wireless communication device between a first cell of the wireless communication network and a second cell of the wireless communication network, wherein the step of computing a decrypting sequence is performed prior to the step of receiving encrypted packeted data if, in addition to measured reception quality being above said threshold, cell handoff is not detected.

5. The method of claim 3, wherein reception quality is determined by at least one of a bit error rate and an error rate per block.

6. The method of claim 5, wherein reception quality is computed at the physical layer.

7. The method of claim 3, wherein reception quality is determined by a channel quality indicator (CQI).

* * * * *